United States Patent
Earp et al.

[15] 3,670,337
[45] June 13, 1972

[54] RADIO NAVIGATION BEACON UTILIZING A COMMUTATOR WHICH SUPPLIES RADIO FREQUENCY IN SUCCESSION TO SEVERAL AERIALS

[72] Inventors: Charles William Earp, London; Francis Giles Overbury, Cuffley, both of England

[73] Assignee: International Standard Electric Corporation, New York, N.Y.

[22] Filed: Jan. 21, 1970

[21] Appl. No.: 4,653

[30] Foreign Application Priority Data

Feb. 5, 1969 Great Britain..........................6,157/69

[52] U.S. Cl. .......................343/108, 343/106 D, 343/112 DE
[51] Int. Cl. ..............................................................G01s 1/16
[58] Field of Search.................343/106 D, 113 DE, 101, 108

[56] References Cited

UNITED STATES PATENTS

| | | | |
|---|---|---|---|
| 3,290,685 | 12/1966 | Steiner | 343/112 DE |
| 3,290,687 | 12/1966 | Hofgen | 343/106 D |
| 3,234,554 | 2/1966 | Earp et al. | 343/112 DE |

*Primary Examiner*—Rodney D. Bennett, Jr.
*Assistant Examiner*—J. M. Potenza
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A radio navigation beacon is provided having a linear array of equally spaced aerials and means which commutate radio-frequency to each said aerial in succession so as to produce bi-directional constant-velocity scanning of the array. Further means including an aerial for radiating radio-frequency energy of a frequency which differs by a fixed amount from the radio frequency which is commutated to the array. The sign of frequency difference is changed at each half period of commutation to the array.

8 Claims, 3 Drawing Figures

Inventors
CHARLES W. EARP
FRANCIS G. OVERBURY
By
Attorney

RADIO NAVIGATION BEACON UTILIZING A COMMUTATOR WHICH SUPPLIES RADIO FREQUENCY IN SUCCESSION TO SEVERAL AERIALS

BACKGROUND OF THE INVENTION

This invention relates to radio navigation beacons.

In our co-pending application No. 859,915 now U.S. Pat. No. 3,626,419 (C.W. Earp-140) there is described the use of linear array radio beacons in which a source of radio-frequency is commutated to separate elements in order to simulate uni-directional constant-velocity motion of the source. As described in the above-mentioned application, the system permits receiver techniques in which the direct wave can be filtered from obstacle-reflected waves by the process of frequency filtering, whereby directional information can be derived with minimal error due to the effect of obstacles, or ground-reflected signals.

The system described said co-pending application No. 859,915, however, suffers from the fact that large radio-frequency phase transients between successive linear sweeps cannot be avoided at all positions of the associated receiver.

Through radio-frequency phase transients between wave-packets from adjacent aerials would, in practice, be avoided by the use of amplitude tapered overlapping wave-packets, this is only really effective up to maximum phase steps of about ± 120°. The technique, in any case, cannot cater for the indeterminate phase step of any possible value, between wave-packets corresponding to radiations from opposite ends of the linear array.

A similar problem is apparent in the frequency shift radio telegraph system of communication, where rectangular-wave frequency modulation is used to avoid radio-frequency transients. If two independent frequency sources are switched on alternately, then radio-frequency transients would arise, causing the total radiation to occupy a very large frequency spectrum.

Thus, in the linear-array Doppler beacon, it is desirable to avoid large phase transients, and the large frequency spectrum which could arise from switching between widely-spaced radiators such as the two end-radiators of a linear array.

SUMMARY OF THE INVENTION

According to the invention, there is provided a radio navigation beacon including a linear array of equally spaced aerials, means for commutating radio-frequency energy to each said aerial in succession so as to produce bi-directional constant-velocity scanning of the array, means including a further aerial for radiating radio-frequency energy of a frequency which differs by a fixed amount from the radio frequency which is commutated to the array, and means for changing the sign of the frequency difference at each half period of commutation to the array.

Thus, in order to avoid the previously-mentioned defect of the uni-directionally swept beacon, a feature of the present proposal is to use bi-directional sweeping of the aerial system. In a simple case, if aerials $a$, $b$, $c$, $d$, $e$ are arranged equally spaced in line in that order, then the commutation cycle giving a constant velocity bi-directional sweep, would be $a, b, c, d, e, d, c, b, a, b, c$, etc.

Another feature is the use of a linear array of equally spaced aerials which are excited sequentially to simulate constant velocity motion of a radio frequency source causes the radiated signal to undergo a Doppler frequency shift which is variable with direction. Hence glide angle as determined from a vertical array, and bearing as determined from a horizontal array, are each coded in terms of frequency. By the use of a reference wave, off-set in frequency from the commutated wave, and radiated from a fixed location, the Doppler frequency displacement of the commutated signal may readily be detected and measured with accuracy by simple digital methods. There is immunity from the effect of signals reflected from an imperfect ground-plane as, having an opposite sense of Doppler frequency shift from that of the direct wave, they can be removed frequency selectivity in the receiver.

Simulation of motion is effected by commutation of a wave successively to the separate aerials of the array, excitation by suitably shaped over-lapping pulses permitting a smooth progression of phase of the radiated signal. Such smooth variation of phase is only possible when switching is between adjacent aerials, so the commutation cycle is made to correspond to to-and-fro constant velocity motion.

This procedure mitigates the effect of undesirable phase transient of the commutated wave, but involved another new procedure, as opposite directions of sweep product opposite Doppler frequency displacement of the radiated signal, and the beat frequency between the commutated radiation and a fixed reference wave would alternate between two separate values according to sense of sweep.

This difficulty is avoided by a further feature of arranging to radiate a reference wave which alternates in frequency between two values, substantially equally spaced above and below the commutated-wave frequency, according to sense of sweep. Thus, the alternating radio-frequency Doppler displacement is translated to directional displacement of the beat-frequency between the two radiations.

One more precaution is necessary, the avoidance of radio-frequency phase transients when the reference wave is suddenly changed in frequency.

Thus in the present invention the feature of bi-directional constant velocity scanning is used, and either the reference wave or the commutated wave, or both, are shifted in frequency according to direction of sweep.

This avoids any marked radio-frequency phase transients in the transmitted wave, resulting in economy of frequency bandwidth, but chiefly minimizes the spectrum width of the ground-reflected signal, so permitting a maximum possible filtering of ground-reflected signal from the wanted direct-path signal.

In order that digital counting techniques can be used in the associated receiver for measurement of the beat frequency, it is arranged that successive frames of signal (each frame being a bi-directional scan of the array) are not identical, so that the count will not be digitized in coarse steps in exact multiples of serial array commutation frequency.

BRIEF DESCRIPTION OF THE DRAWINGS

The above-mentioned and other features of the invention will become more apparent and the invention itself will be best understood by reference to the following descriptions of preferred embodiments of the invention taken in conjunction with the accompanying drawings in which.

DESCRIPTION OF THE PREFERRED EMBODIMENTS

Figure 1:
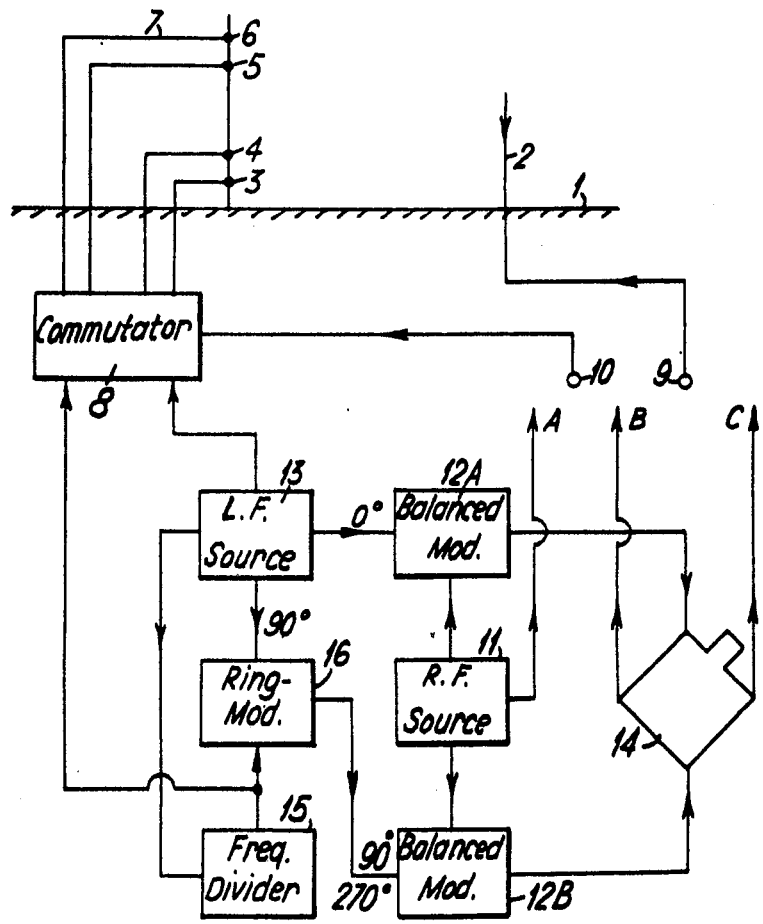
FIG. 1 shows a radio navigation beacon having an aerial array and a reference aerial and associated block schematic circuitry for aerial energization.

Referring to FIG. 1, above ground plane 1 is a reference aerial 2 positioned at such a height above the ground plane, and if necessary being provided with counter-poises, that its signal is radiated over the whole service volume of the beacon.

There is an aerial array which includes a number of equally spaced radiating elements, some of which are shown at 3, 4, 5, and 6, which are vertically stacked above the ground plane 1.

Each of the elements of the array is connected by a separate feeder, such as 7, to a commutator arrangement 8. Suitable radio-frequency energy is passed to the reference aerial 2 and via the commutator 8 to the aerial array from terminal points 9 and 10 as will be later described.

A radio frequency F (for example 1 GHz) from a radio frequency source 11 is applied to a terminal point A and to each of two balanced modulators 12A and 12B, each of which modulators is also fed by a first output from a low-frequency source 13 of frequency $f$, the phase of one low-frequency modulator input being in phase quadrature with the other modulator input.

Output from each modulator 12 is a double sideband or pair of frequencies $F + f$, and $F - f$. After correct adjustment of relative radio-frequency phase of these double-sideband outputs, they are applied to opposite corners of a bridge 14 comprised of three arms of quarter-wavelength transmission lines, and one arm of three-quarter-wavelength. Under these circumstances, output at terminal point B may be entirely of frequency $F + f$, and output at terminal point C entirely of frequency $F - f$.

A second output of the source 13 of frequency $f$ is subjected to frequency division by a integral number by frequency divider 15. For example, if $f$ is 4,000 Hz, this might be divided by 20 to yield a square wave of frequency 200 Hz. This square wave is used to operate on a ring-modulator 16 fed by the 4,000 Hz input to the balanced modulators 12B in order to reverse its phase at instants spaced by 1/400 second. It is arranged that the instantaneous voltage of the 4,000 Hz wave is zero at the instants of switching, so that no amplitude transient takes place. Exactly 10 complete cycles of the 4,000 Hz wave are passed to the radio-frequency modulator for each half-cycle of the switching wave.

Aerial commutation pulses are derived from the 200 Hz switching wave, so that separate half-cycles correspond to synchronous sweeping of the aerial array.

Now, the effect of reversing the phase of input to one modulator so that it alternates between +90° and −90° with respect to the other is to alternate the sidebands selected at B and C. Thus, while output B alternates between $F - F$ and $F + f$, output C synchronously alternates between F +f and F − f. While alternating, neither the output B or C suffers any radio-frequency phase transient.

The beacon may now be operated in any of the following ways.

1. Fixed-aerial reference wave from A connected to 9, at frequency F. Commutated radiation either from B or C connected to 10. (Alternating $F - f, F + f$).
2. Fixed-aerial reference wave from B or C connected to 9. Commutated radiation from A connected to 10.
3. Reference wave from $B$ connected to 9 alternating $F - f, F + f$
   Commutated wave from C connected to 10 alternating $F + f, F - f$ } or vice-versa.

The third arrangement is to be preferred, since it involves the radiation of two frequencies only, and avoids possible difficulty which could be caused by a different interpretation of phase of the beats between $F/(F - f)$ and $F/CF + f)$, a defect which could arise if the receiver were not precisely tuned.

The aerial array may be arranged in a horizontal plane, instead of vertical, or may be tilted.

The associated receiver is suitably arranged to respond to the selected one of the three above mentioned beacon operating arrangements, and to extract the required navigational information, e.g. glide angle from a vertical array or bearing from a horizontal array.

If the third operating arrangement is utilized, the associated receiver may be arranged for digital counting techniques, and this will now be described.

Figure 2:
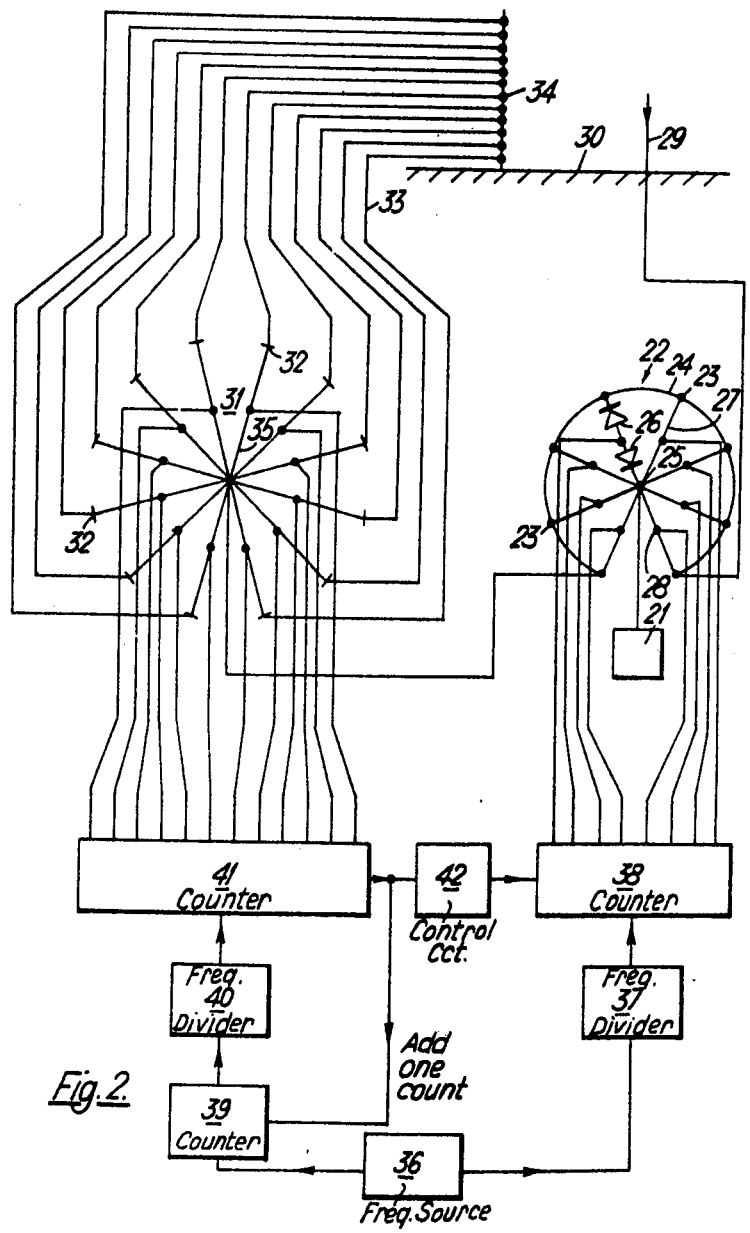
FIG. 2 is a ground beacon.

Referring to FIG. 2, the output from a radio-frequency source 21 of frequency F is applied to a sideband generator 22 (described in our co-pending application No. 13249/69 (C.W. Earp-F.G. Overbury 145-6) having feeds to eight separate tapping points 23 on a radio-frequency transmission line 24, which is a strip-line in the form of an arc centered on input terminal 25, the tapping points 23 being spaced at intervals of one-eighth transmission line wavelength.

The strip line 24 is spaced from a conducting ground-plane (not shown) by a non-conducting material (not shown) of dielectric constant of 4, so that line wavelength is half the free space wavelength. The radio-frequency source 21 is applied to the center 25 of a star-connected system of eight pairs of diodes 26 which feed the various tappings 23. In FIG. 2 only one such pair of diodes 26 has been shown to avoid confusing the drawing.

Radial arms 27 are made to conduct by direct current pulses applied to the junctions and between pairs of diodes 26, so that a succession of pulses from a suitable distributor (to be described later) is able to advance the phase of the output from one end of the line 24 in steps of 45°, while the output from the other end of the line 24 is correspondingly retarded in phase. Hence the two outputs from the generator 22 correspond to digitally produced upper and lower sidebands of the radio frequency source. By suitable shaping of the d.c. pulses to provide a smooth overlapping in time phase transients due to the 45° steps can be made insignificant. Electronic rotation of the pulse distribution at 4 kHz produces an upper sideband at $F + 4$ kHz, and a lower sideband at $F - 4$ kHz.

One output from the sideband generator 22 is fed to a fixed reference aerial 29 situated near to ground level 30 in order to radiate over the whole service volume required. The second output is fed to an electronic distributor 31 having 12 separate output points 32 whose outputs are used to feed via feeders 33 a system of 12 aerials 34 which constitute a vertical stack of uniformly spaced elements of total height about 9 meters.

The distributor 31 consists of 12 star-connected arms 35 each containing a diode (not shown) which can be switched in turn to provide radio-frequency connection to corresponding aerials 34. Sufficient suppression of leakage through diodes in their non-conducting state is assisted by an additional system of diodes (not shown) within the radiating elements, one associated with each element.

The aerial distributor 31 is made to alternate in sense of rotation to cause to-and-fro scanning, in order to simulate constant-velocity linear to-and-fro motion of a single radiator, complete bi-directional scanning being repeated at (8,000/22) Hz or 363.6 Hz.

The sideband generator 22 and the aerial distributor 31 are synchronously operated so that during each upward sweep of aerial commutation the sideband generator rotates in one direction, and reverses in sense of rotation during each downward sweep. Thus, the beat frequency between the two radiations, as received by a mobile receiver, undergoes a uni-direction Doppler frequency displacement.

The switching circuits will now be described. A stable frequency source 36 of 512 kHz delivers two outputs at this frequency. One output is passed through a divide-by-two pulse frequency divider 37 to yield pulses at 256 kHz, and these pulses are applied to a rotary reversible counter 38 of 64 bits. From this counter 38 is derived a succession of eight pulses, one pulse from each of eight sectors of eight input pulses, or the corresponding three binary bits of the counter 38, Unidirectional counting or rotation is at a cycle rate of 4 kHz and successive pulses from the counter 38 are used to actuate the sideband generator 22.

The other output of the frequency source 36 is applied to a rotary counter 39 of thirty two bits to provide pulses at 16 kHz, and these pulses are applied to a divide-by-two pulse frequency divider 40 to give output pulses at 8 kHz. The output pulses from the divider 40 are used to operate a twelve-position reversing or 'to-and-fro' counter 41 of 22 bits, which provides frames of 22 pulses to twelve outputs. The output pulses from the counter 41 are used to cause to-and-fro rotation of the aerial distributor 31 for the required bi-directional scanning of the vertical array of aerials 34 at 363.6 Hz.

At the midpoint in time of each pulse from the counter 41 which corresponds to the lowest aerial 34 of the array, pulses are derived at the scanning or frame frequency of 363.6 Hz and applied to a control circuit 42 which causes reversal of the counter 38 driving the sideband generator 22 at successive positive and negative edges of the pulses. Hence, rotation of the sideband generator alternates with sense of aerial array sweep or scan.

With the switching processes as described so far, successive scanning cycles would be identical. This would result in digital counting of the received beat spectrum automatically being limited to exact multiples of scanning rate, and 'count' of glide-angle would correspond to digital steps of about 1°.

It is therefore necessary to shift the phase of the sideband-producing frequency by a small amount between each bi-directional sweep of the array. This causes the digital counter in the receiver to be presented with Doppler information in the form of successive 'frames' containing incomplete cycles of beat frequency, but in successively different phase states. Under these circumstances, a single bi-directional scanning period is not repeated in identical form until after a large number of intervening periods. Over the new group period of many aerial array sweeps, the number of zero-crossings in the receiver will be proportional to the number of complete cycles of beat frequency, plus any fraction thereof, contained in a single sweep. The accuracy of measurement depends upon the number of steps of phase necessary to complete a whole cycle, and hence to re-start exact repetition of a new group-period, so high accuracy information is at a reduced rate.

This change in phase between successive bi-directional scans of the aerial array is achieved by making clock-wise and anti-clockwise periods of the counter 38 slightly unequal, so that there is a continuous progression of its state at moments of commencement of successive sweeps of the array.

At the beginning of each sweep, therefore, an additional count of unity is added to the preceding counter 39 used for derivation of aerial commutation pulses. This results in the period of radiation from the lowest aerial 34 being 1/64 less than the other periods of radiation, and clockwise and anti-clockwise durations of sideband generation being unequal.

The effect of this is to avoid exact signal repetition for 64 scanning periods, so a digital counter of the received beat spectrum is able to operate with digital steps reduced by the same factor. Hence, counting accuracy corresponds to new digital steps corresponding to elevational increments of about 1' of arc.

Figure 3:
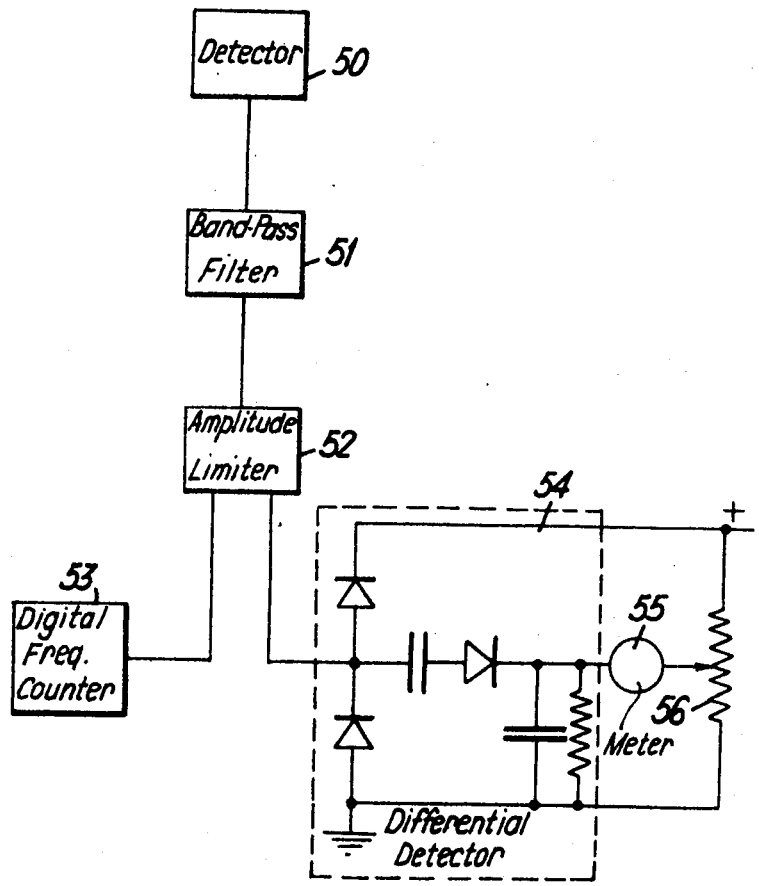
FIG. 3 is an associated receiver together constituting equipment designed for operation on a radio-frequency of about 1 GHz in order to permit a glide-path system with a vertical array not exceeding 9 meters in height.

The receiver (FIG. 3) used for interpretation and display is of conventional design as far as the amplitude-envelope detector 50, the output from which is the beat-frequency spectrum derived from the commutated and reference radiations. Constants chosen for the ground-beacon correspond to a beat-spectrum centered on 8 kHz broadside to the transmitting array, that is at ground level, and it is arranged that beat-frequency decreases at high angles of elevation, which means that ground reflections correspond to frequencies higher than 8 kHz. This is achieved by upward scanning with the lower sideband frequency, and downward scanning with the higher sideband frequency.

After the receiver detector 50 there is a bandpass filter 51 covering the range 5 to 8 kHz in order to select the direct path signal, and reject the ground reflected signal.

If the vertical array of aerials at the ground beacon is 30 wavelengths in height, the range of beat frequency, 5 to 8 kHz, corresponds to zero elevation (for 8 kHz) to about 8° for 5 kHz. Under these circumstances, a frequency count is linear between 8° and 2°, and good 'clearance' information is available down to an elevation angle of 1°. (A greater range of linear count of elevation angle could be obtained by the use of a greater number of radiating elements in the array.)

After selection of the 5 to 8 kHz range of beat frequency, the signal is limited by an amplitude limiter 52, and applied either to a conventional digital frequency counter 53 to yield an alpha-numeric display, or may be processed by a differential detector arrangement 54 to operate a meter 55 to indicate sense and amount of departure from a chosen glide angle pre-set by potentiometer 56.

A suitable 'flag-warning' system may be provided for avoidance of a false count at ranges where adequate signal strength is not available.

Although we have described the invention in connection with specific apparatus, it should be clearly understood that this description is made only by way of example and not as a limitation to the scope of my invention as set forth in the objects thereof and in the accompanying claims.

We claim:
1. A radio navigation beacon including a linear array of equally spaced aerials, means for commutating radio frequency energy to each said aerial in succession so as to produce bi-directional constant velocity scanning of the array, means including a further aerial for radiating radio-frequency energy of a frequency which differs by a fixed amount from the radio-frequency which is commutated to the array, and means for changing the commutated radio-frequency and the frequency of the signal radiated by said further aerial such that the frequency difference is positive during one half period of commutation to the array and negative during the other half period of commutation to the array.

2. A radio navigation beacon as claimed in claim 1 in which said frequency difference is an integral multiple of the aerial scanning commutation rate.

3. A radio navigation beacon as claimed in claim 1 in which the commutated radio-frequency is constant and the frequency radiated by said further aerial is changed by twice said fixed amount at each half period of commutation.

4. A radio navigation beacon as claimed in claim 1 in which the frequency radiated by said further aerial is constant and the commutated radio-frequency is changed by twice said fixed amount at each half period of commutation.

5. A radio navigation beacon as claimed in claim 1 in which the commutated radio-frequency and the frequency radiated by said further aerial are interchanged at each half period of commutation.

6. A radio navigation beacon as claimed in claim 5 including means for causing a phase change of the commutated radio-frequency energy between each successive bi-directional scan of the array, and in which successive phase changes are of equal magnitude and in the same direction, so that the same phase relation repeats at intervals of a number of said scans.

7. A radio navigation beacon as claimed in claim 5 in which there is an equal period of radiation of the commutated radio-frequency energy from each of the aerials of the array.

8. A radio navigation beacon as claimed in claim 1 in which the array is vertical.

* * * * *